United States Patent [19]

LeBaron

[11] Patent Number: 4,588,054
[45] Date of Patent: May 13, 1986

[54] LINEAR MOTION DAMPER

[76] Inventor: Chester F. LeBaron, 65 Spring St., Goshen, N.Y. 10924

[21] Appl. No.: 56,446

[22] Filed: Jul. 11, 1979

[51] Int. Cl.⁴ .......................... F16F 9/49; F16F 11/00
[52] U.S. Cl. ..................... 188/280; 92/182;
 92/185; 188/129; 188/271; 188/282; 188/298;
 188/381
[58] Field of Search ............... 188/298, 300, 317, 322,
 188/280, 67, 129, 282, 322.15, 322.22, 381, 271,
 265; 403/372; 192/88 B, 85; 403/372; 267/139,
 134, 65 R, 9, 64.23, 64.27, 64.12; 92/181 P,
 182–185

[56] References Cited

U.S. PATENT DOCUMENTS

| | | | |
|---|---|---|---|
| 1,417,514 | 5/1922 | Glaser | 92/182 X |
| 1,641,547 | 9/1927 | Miller | 92/185 X |
| 1,678,365 | 7/1928 | Sutliff | 92/183 |
| 2,093,281 | 9/1937 | Kreuser | 192/85 |
| 2,111,422 | 3/1938 | Fawick | 192/85 X |
| 2,888,106 | 5/1959 | Peras | 188/298 |
| 2,928,507 | 3/1960 | Thompson | 188/271 |
| 3,054,478 | 9/1962 | Rumsey | 188/271 |
| 3,167,157 | 1/1965 | Thorn | 188/298 |
| 3,486,776 | 12/1969 | LeBaron | 403/372 |
| 3,794,310 | 2/1974 | Mewhinney | 267/139 |
| 3,829,142 | 8/1974 | Bommarito | 293/134 |
| 4,061,386 | 12/1977 | Chupick | 293/134 |
| 4,093,052 | 6/1978 | Falk | 403/372 X |
| 4,166,612 | 9/1979 | Freitag et al. | 188/300 X |

FOREIGN PATENT DOCUMENTS

| | | | |
|---|---|---|---|
| 607357 | 12/1934 | Fed. Rep. of Germany | 267/65 R |
| 1147806 | 4/1963 | Fed. Rep. of Germany | 188/271 |

Primary Examiner—Douglas C. Butler
Attorney, Agent, or Firm—Ronald S. Cornell

[57] ABSTRACT

A linear motion damper is disclosed which comprises a hollow sleeve member, a rod reciprocating within the sleeve member, and a piston adapted to engage a fluid filled cylinder to provide resistance to linear motion by the exertion of lateral fluid pressure between the rod and the sleeve. The damper of the present invention exhibits greater efficiency and durability in operation, and is adaptable for a wide variety of applications.

10 Claims, 3 Drawing Figures

LINEAR MOTION DAMPER

BACKGROUND OF THE INVENTION

The present invention relates generally to linear motion damping devices, and particularly to those devices adapted for use as shock absorbers and impact energy absorbers employed in safety bumper assemblies for automobiles.

In the area of damper devices employed to lessen the impact of sudden linear motion, the conventional construction has comprised the provision of a sealed, fluid filled cylinder containing therewithin a piston mounted upon a rod and reciprocable within the cylinder. Such devices, commonly known as shock absorbers, find application in a wide variety of instances, including the reduction of vibration in industrial machinery, and motor vehicles. In the instance where the shock absorber is installed in a motor vehicle, the generally larger diameter cylinder portion is pivotally mounted to the upper frame of the vehicle, while the smaller diameter piston and rod project oppositely from the cylinder and are fastened to the wheel assembly. Thus, vertical movement of the wheel assembly, as in the instance where an uneven road surface is encountered, causes the piston to travel upward within the cylinder, where it encounters resistance from a spring or from the pressurized fluid contained therein. The axial movement of the piston is limited by the oppositely directed axial pressure offered by the spring or compressed fluid within the cylinder.

The construction described above has been in use for many years, and with relatively minor modification, remains unchanged to the present in its reliance upon the axial application of fluid pressure to limit linear motion. While this design has stood the test of time, it nonetheless suffers from certain defects. Specifically, the shock absorbers employed in automotive applications, despite improvements in piston and fluid seal design, and the fluids themselves, exhibit a limited durability and useful life in service. Particularly in the instance where the vehicle in question is driven frequently over roads lying in serius disrepair due to the severity of winter conditions, the shock absorbers are subjected to severe, repeated impact as the vehicle travels over roads covered with unrepaired pot holes. This type of abuse quickly degrades the fluid seals surrounding the piston, with the result that the shock absorber is no longer capable of maintaining the fluid pressure necessary to offer the desired resistance to linear motion. Additonally, conventional shock absorbers offer a fixed resistance to shock, i.e. the resistance does not vary even though the shocks to which they are subjected vary from very minor to quite severe.

Applicant has considered the problems raised by the above phenomenon and has determined that the surface area presented by the transverse face of the piston is inadequate to withstand the repeated impacts of daily use, as excessive pressure per unit area is forced to impinge thereupon. Applicant determined that a more desirable damper design would attempt to provide greater surface area within present size requirements, for the reception of fluid resistance to increase the impact resistance capacity of the damper unit.

As noted above, the conventionally constructed shock absorber has found recent application as part of energy absorbing bumper systems which are now required by law to be installed on all motor vehicles manufactured for use and sale in the United States. In this connection, U.S. Pat. No. 3,829,142 to Bommerito and U.S. Pat. No. 4,061,386 to Cupik, the latter referring to U.S. Pat. No. 3,794,310 to Mewhinney, are representative of the incorporation of the basic shock absorber design discussed above, with minor modification, as part of the energy absorbing unit employed within the bumper assemblies.

In U.S. Pat. No. 3,486,776 issued to Applicant on Dec. 30, 1969, a clutch or brake assembly is disclosed for the purpose of curtailing the rotation of a roller on a shaft by the exertion of laterally directed fluid pressure applied between the adjacent surfaces of the shaft and the roller, to frictionally engage the adjacent surface to impede the rotation of one relative to the other. The application of fluid pressure to an expansible surface to frictionally engage an adjacent rotating surface in the manner of a clutch or a brake, is acknowledged in the prior art, as exemplified by U.S. Pat. No. 2,093,281 to Kreuser, U.S. Pat. No. 2,111,422 to Fawick, and more recently, in U.S. Pat. No. 4,093,052 to Falk. In all of the foregoing instances, lateral fluid pressure is manually applied to achieve extended frictional engagement, in most instances for the purpose of achieving the rotation of two separate members in union, or to curtail the motion of both members entirely. No disclosure has been found that would suggest that the exertion of lateral fluid pressure would be effective in a damper for the control of linear motion.

SUMMARY OF THE INVENTION

In accordance with the present invention, a fluid-actuated damping device for the control of linear movement is disclosed which comprises a hollow sleeve member, a rod reciprocably disposed within the sleeve member, a cylindrical bore adapted to hold a quantity of hydraulic fluid which is axially aligned and linearly displaced with respect to the sleeve member, and a piston mounted on the end of the rod poximate to the cylindrical base and situated for fluid tight reciprocation therewithin. A radially expansible annular fluid chamber is interstitially disposed between the sleeve member and the rod, and is positioned for simultaneous pressured frictional abutment with the adjacent surfaces of the sleeve and the rod, to exert a lateral fluid pressure to limit the linear motion of the rod with respect to the sleeve.

The above construction further includes a fluid conduit connecting the annular fluid chamber and the cylindrical bore, so that the interstitial linear compression exerted by the piston results in the application of the responsive lateral pressure.

The present invention may be incorporated into shock absorbers and the like useful in all applications heretofore contemplated by dampers of conventional linear construction. Thus, the present invention contemplates the preparation and employment of automotive shock absorbers, industrial machinery shock absorbers, and energy absorption units for use as part of mandatory safety bumper assemblies.

The basic construction of the present damper is easily manufactured for retrofitting into existing machinery and vehicles employing conventional damper devices.

Accordingly, it is a principal object of the present invention to provide a damper for the control of linear motion which employes the lateral application of fluid pressure as the primary damping means.

It is a further object of the present invention to provide a damper as aforesaid which offers improved damping performance through increased capacity for the application of damping pressure.

It is yet a further object of the present invention to provide a damper as aforesaid which exhibits greater durability and sensitivity in use.

A still further object of the present invention is to provide a damper as aforesaid which is inexpensive to manufacture and easily replaces conventional linear motion damper devices.

Other objects and advantages will become apparent to those skilled in the art from a review of the ensuing description which proceeds with reference to the following illustrative drawings.

DETAILED DESCRIPTION OF THE INVENTION

Figure 1:
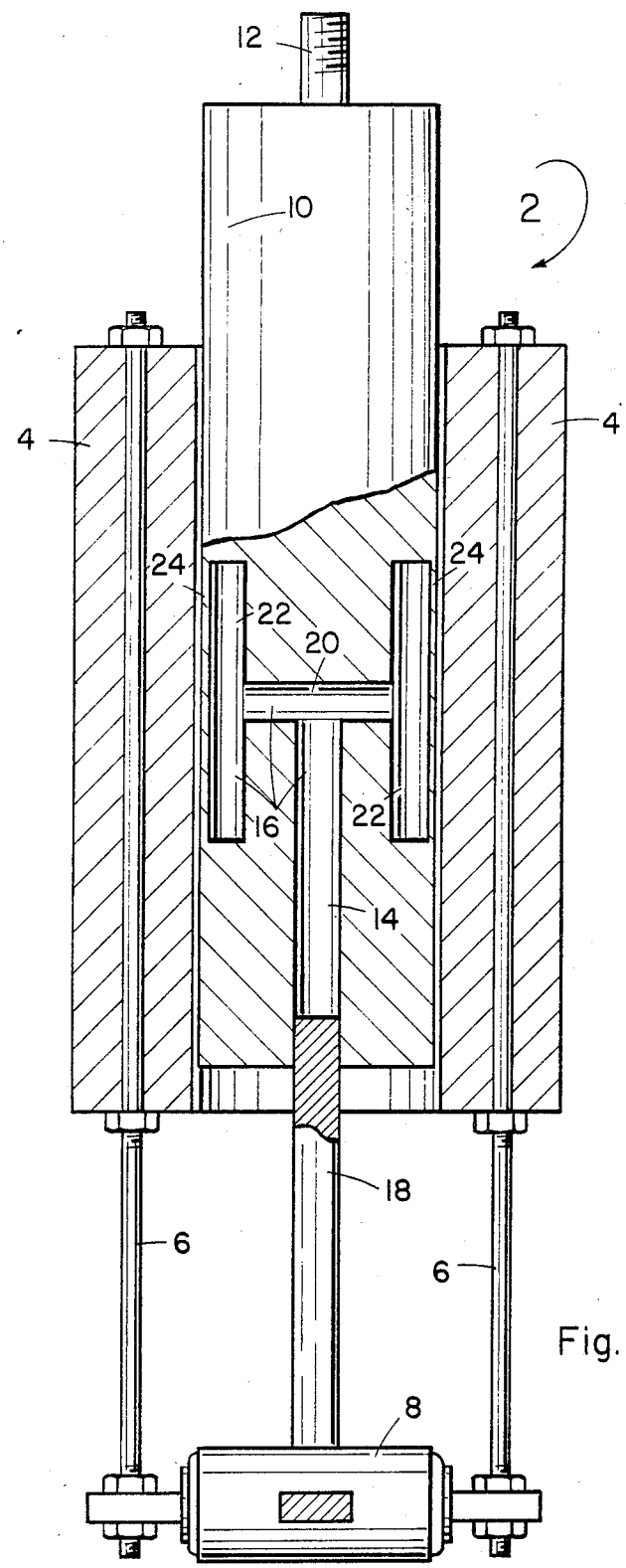
FIG. 1 is a side sectional view illustrating a shock absorber prepared in accordance with the present invention.

Referring now to FIG. 1, the present invention is illustrated in one embodiment comprising the construction of a shock absorber. Thus, shock absorber 2 comprises a hollow sleeve member 4, which in the illustration, is an elongated cylindrical structure anchored by four bolts 6, two of which are illustrated, to a lower wheel assembly attachment yoke 8. A rod 10 is disposed within sleeve member 4 and is adapted for attachment at the free end thereof to the undercarriage of the automobile by the provision of threaded attachment 12. In the illustration, rod 10 is fixedly attached to the undercarriage of the automobile, and therefore, sleeve 4 is movable and adapted for reciprocation therealong.

Shock absorber 2 further includes a cylindrical bore 14 adapted to contain a quantity of fluid 16 under pressure. Piston 18 extends axially from its attachment to yoke 8 into telescopic engagement with rod 10 within cylindrical bore 14. Piston 18 makes fluid tight, slidable engagement with bore 14 and, in operation, reciprocates therewithin to urge fluid 16 to travel through fluid conduits 20 to enter radially expansible annular fluid chamber 22.

Fluid chamber 22 is disposed inwards to the outer wall of rod 10, and is adapted to expand to exert lateral pressure to cause the adjacent surfaces of rod 10 and sleeve 4 to frictionally engage. Fluid chamber 22 is adapted for expansion by the provision of a resilient annular wall 24 which surrounds chamber 22. Thus, when a linear force is exerted on the wheel assembly of the automobile and the impact is translated through yoke 8, piston 18 is caused to move linearly upward to apply pressure against fluid 16 within cylindrical bore 14, causing pressure to translate through conduits 20 to annular fluid chamber 22. The successive pressure build-up causes the resilient wall 24 to expand radially outward to frictionally engage the inner surface of sleeve 4, which results in the development of a resistance to the linear force which reduces the impact thereof.

The shock absorber illustrated in FIG. 1 is essentially a closed system in that a finite amount of fluid 16 is provided for circulation therein. The fluid tight environment may be maintained by conventional means such as gaskets or rings, now shown, provided on piston 18 for engagement of the inner surface of bore 14. Thus, once linear impact is sufficiently damped, and the pressure exerted by piston 18 is relieved, fluid 16 leaves chamber 22 and returns to conduits 20 for reentry in the bore 14. Likewise, sleeve member 4 is again able to reciprocate with respect to rod 10 as the frictional engagement therebetween has been relieved.

The longitudinal dimension of chamber 22 may vary depending upon the specific application. In FIG. 1, the longitudinal dimension of chamber 22 is substantially smaller than that of sleeve 4 to facilitate the reciprocation of sleeve 4 along rod 10 while retaining chamber 22 in position to make simultaneous contact along its entire longitudinal dimension with both sleeve 4 and rod 10. In this manner, the flexible wall 24 is supported along its entire length during the application of pressure, and the possibility of rupture in operation is avoided.

It is clear that as the severity of impact increases, the fluid pressure within chamber 22 also increases, causing the damping force exerted by wall 24 against sleeve 4 likewise to increase. In this connection, flexible wall 24 may be prepared from a wide variety of materials exhibiting sufficient flexure and pressure resistance in use. In a preferred embodiment, illustrated herein, wall 24 is prepared from a resilient metal, such as stainless steel or the like. Naturally, the invention is not limited to the selection of a particular material, as the foregoing materials are illustrative, rather than restrictive.

Figure 2:
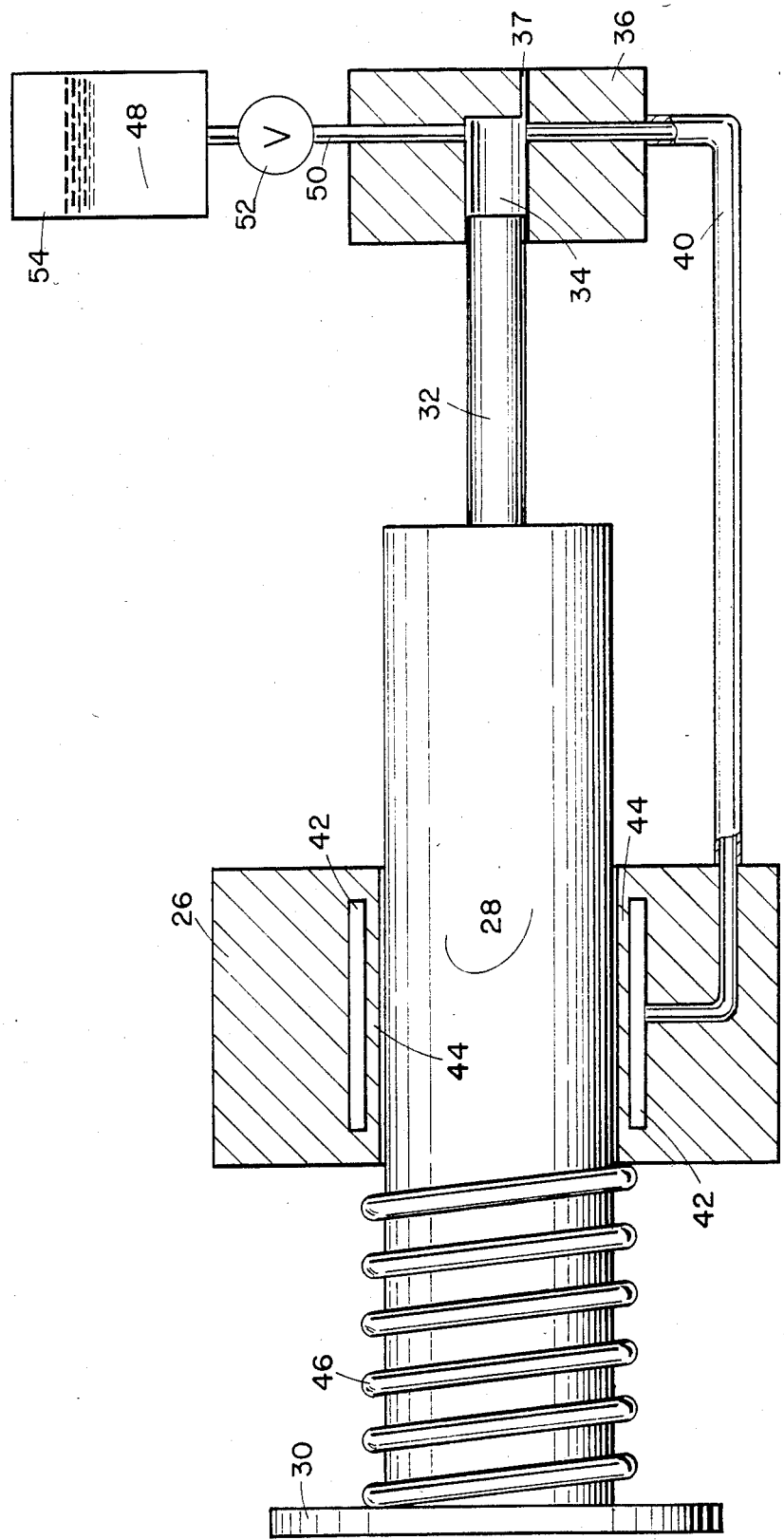
FIG. 2 is a side sectional view illustrating a bumper impact adapter prepared in accordance with the present invention.

In a further embodiment of the present invention, illustrated in FIG. 2, a bumper impact adapter is prepared which comprises a generally cylindrical sleeve 26 which is annularly disposed about a reciprocating rod 28 defining at one end thereof an impact plate 30 adapted for attachment to an automobile bumper. Sleeve 26 in turn is fixedly secured to the framework of the automobile and is therefore maintained in a stationary position throughout the operation of the adapter. Rod 28 defines at the oppostie end thereof piston 32 which is adapted to telescopically engage a cylindrical bore 34 defined within support block 36. Piston 32 is disposed in fluid tight engagement within bore 34 in a manner similar to that discussed with respect to FIG. 1. Support block 36 is fixedly mounted to sleeve 26 and may, in an embodiment not illustrated herein, be either detachably attached or integral therewith. In a further embodiment, cylindrical bore support block 36 may be independently fixedly mounted upon the framework of the automobile.

In operation, linear impact received through impact plate 30 and transferred to rod 28 causes piston 32 to further penetrate cylindrical bore 34 to increase pressure upon fluid contained therein. In turn, the fluid is forced to travel through conduit 40 until it enters annular fluid chamber 42 which, as described with reference to FIG. 1, is caused to radially expand to force wall 44 to make frictional contact with the outer surface of rod 28 to absorb the impact received through plate 30. Once the impact is absorbed, pressurized fluid in bore 34 is slowly released through pinhole 37 thereby gradually relieving the frictional contact between wall 44 and rod 28 until the impact adapter can be gradually assisted in resuming its original position by coil spring 46 disposed between plate 30 and the contiguous outer surface of sleeve 26. Spring 46 also assists in absorbing the impact of the linear force exerted against the bumper.

In addition to the assistance afforded by coil spring 46, the impact adapter can be provided with a fluid reservoir 48 which is connected to bore 34 by conduit 50. Conduit 50 is operable via a check valve 52 which selectively permits fluid to enter cylindrical bore 34 to reduce the pressure differential in the system after impact absorption.

Referring further to FIG. 2, reservoir 48 is part of a fluid container 54 which, in the present embodiment, resembles a grease gun. Thus, container 54 provides an automatic (or optionally manual) source of additonal fluid to be provided as necessary to increase the pressure gradient within the bumper impact adapter. Naturally, the choice of materials useful in accordance with the present invention, including the employment of a specific pressure fluid, will vary depending upon the specific utility desired for the damper.

Figure 3:
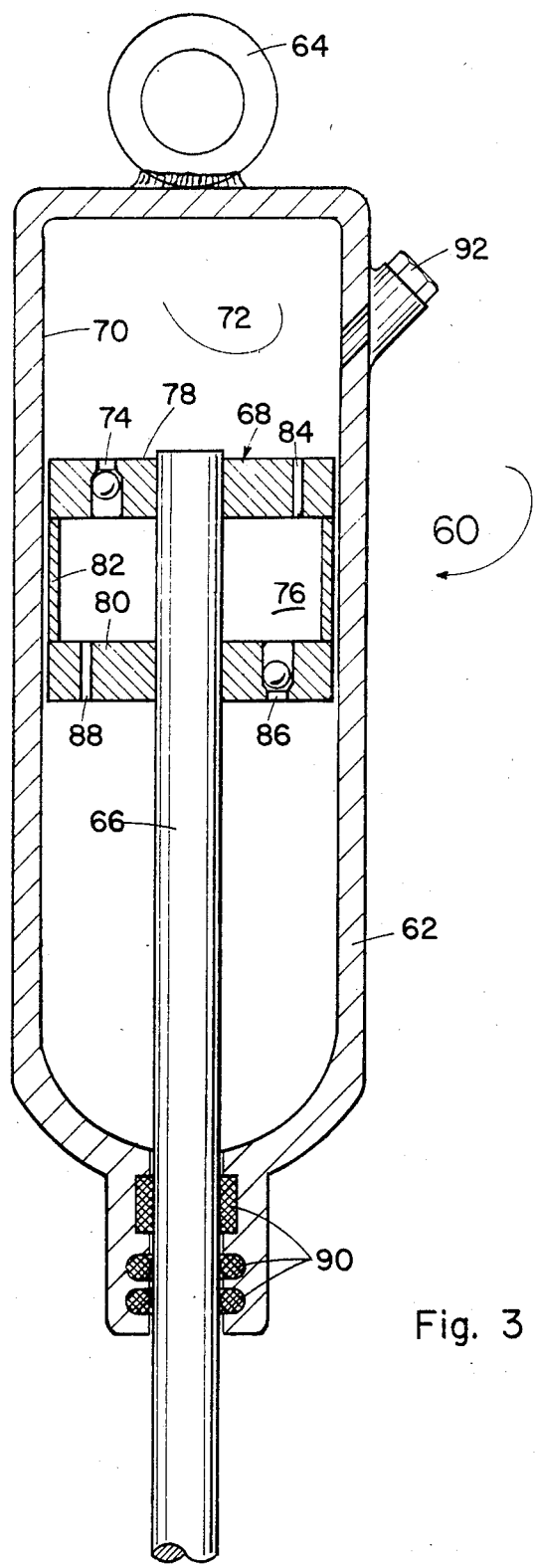
FIG. 3 is a side sectional view similar to FIG. 1 illustrating a shock absorber in accordance with an alternate embodiment of the present invention.

Referring now to FIG. 3, a shock absorber is disclosed herein which comprises an alternate embodiment of the present invention. Thus, FIG. 3 discloses a shock absorber 60 comprising a tubular sleeve 62 adapted by loop attachment 64 for fixed securement to the underside of an automobile. Rod 66 is reciprocably disposed within sleeve 62 and defines at its innermost end piston 68 which travels along the inner surface of sleeve 62 which defines cylindrical wall 70. In certain respects, shock absorber 60 outwardly resembles a conventional shock absorber providing a piston adapted to apply and accept axial pressure. The primary absorption of linear motion through impact occurs by the development of lateral pressure as hereinafter explained.

Axial pressure exerted by the movement of piston 68 against fluid 72 residing within cylinder 70 causes fluid 72 to pass through conduit 74 comprising, in this embodiment, an orifice with a one-way check valve permitting only fluid ingress into the annular fluid chamber 76 defined between parallel walls 78 and 80 of piston 68. Fluid thus builds up pressure within chamber 76 which thereupon exerts a radial force outwardly against annular chamber wall 82 which causes wall 82 to frictionally engage the inner surface of sleeve 62.

Similarly, a sudden dropping motion, as when a tire enters a pothole causes the identical locking action due to the identically operating lower wall 80 which is provided with check valve 86 and bleeder conduit 88.

Retraction of rod 66 after absorption of linear impact is accomplished by gradual outward leaching of fluid 72 through bleeder conduits 84, 88 located in walls 78, 80. The fluid 72 remaining below wall 80 is able to move upwardly through lower piston conduit 86 as well as lower leader conduit 88 to assist in equalizing the distribution of fluid within the shock absorber. Fluid tight engagement between rod 66 and the lower wall of sleeve 62 is maintained by a plurality of oil seals 90 which prevent undue fluid egress.

In accordance with a further embodiment of the present invention, the shock absorber of FIG. 3 is provided with a resealable oil inlet 92 which permits additional fluid to be added to the system. In addition, inlet 92 may be employed as an air bleeder in the instance where a mixture of air and oil is added to the shock absorber. The employment of fluid mixtures as stated may be desirable in instances where variations in firmness and speed of response of the shock absorber are desired. As stated earlier, the damper of the present invention exhibits among its properties the favorable absorption capacity and sensitivity which makes it possible to carefully structure the construction of a damper to suit a particular application. Further, the design of the present damper facilitates its installation without compromise as to dimensions, and the present damper can be easily constructed to be retrofittable to existing installations employing conventional shock absorber units.

The damper of the present invention possesses an increased impact absorptive capacity by virute of the increased surface area available for frictional and radial engagement responsive to linear impact. Thus, for example, a conventional shock absorber would require a substantial increase in width to provide a pressure transmitting surface corresponding to that provided by a comparable shock absorber constructed in accordance with the present invention.

A damper made in accordance with the present invention differs from those made in the past in that the dampers disclosed herein are self-adjusting. The damping force varies in direct proportion to the severity of the impact to which the damper is subjected.

The present damper devices are easily and inexpensively constructed from a wide variety of materials selected within the skill of the art according to the end use of the damper.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A fluid-actuated movement damping device which comprises a hollow sleeve member, a piston reciprocably disposed within said sleeve member, said piston having as an integral part thereof a single, continuous, void free, tubular, metallic, laterally expansible wall for locking said sleeve member and said piston against relative axial movement therebetween, said locking means comprising said hollow sleeve member, said laterally expansible wall, and a source of fluid pressure adapted to expand said wall into locking position, said source being actuated to supply said fluid pressure upon axial reciprocation of said piston relative to said sleeve.

2. The device of claim 1 wherein said expansible wall is a portion of the outer wall of a rod and is adapted to expand into locking position against the inner wall of said hollow sleeve member.

3. The device of claim 1 wherein said expansible wall is a portion of the inner wall of said hollow sleeve member and is adapted to expand into locking position with the outer wall of a rod.

4. The device of claim 1 wherein said expansible wall extends from a first plate to a second spaced plate, each plate being mounted on said piston, said continuous, expansible wall and said plates forming a fluid chamber therebetween, each of said plates having means for permitting rapid entry of fluid into said chamber and means to prevent rapid exit of fluid from said chamber whereby locking fluid pressure can be obtained by relative axial motion of said piston and said sleeve in either direction.

5. The damping device of claim 4 further including a fluid inlet communicating with said cylinder for the introduction of additional fluid thereto.

6. The damping device of claim 5 further including a fluid container operatively connected to said fluid inlet.

7. The device of claim 1 and further comprising means to relieve said fluid pressure whereby to release said locking force.

8. The device of claim 7 and further including spring means adapted to return a rod and said hollow sleeve to their original position relative to each other upon release of said locking force.

9. The device of claim 1 wherein said fluid is a liquid selected from the group consisting of oil, water, grease and mixtures thereof.

10. The device of claim 1 wherein said fluid includes a gaseous material.

* * * * *